July 12, 1960 S. A. BARASH 2,945,186
TRANSISTOR AMPLIFIER WITH VARIABLE FEEDBACK
Filed June 24, 1955
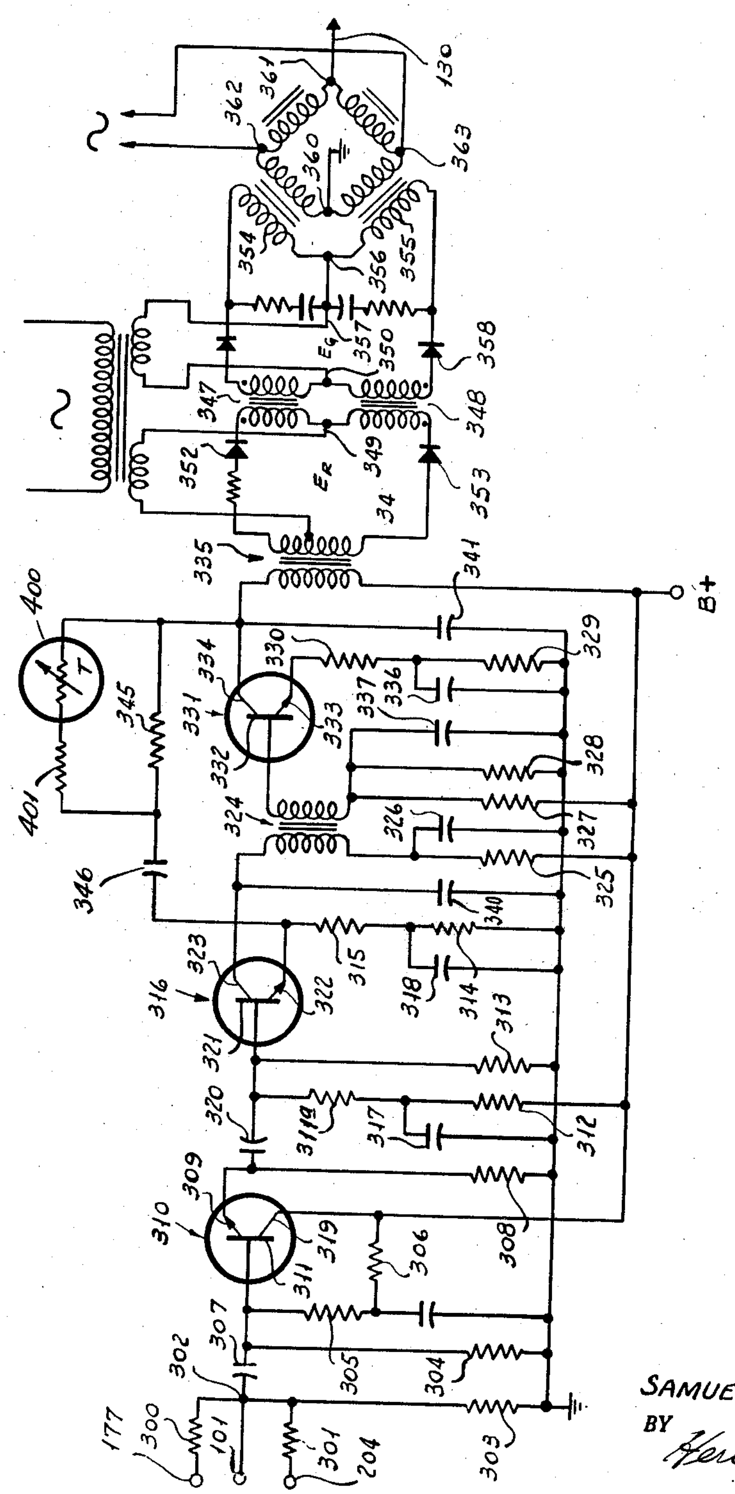
INVENTOR.
SAMUEL A. BARASH
BY Herbert Smith
ATTORNEY United States Patent Office 2,945,186

Patented July 12, 1960

2,945,186

TRANSISTOR AMPLIFIER WITH VARIABLE FEEDBACK

Samuel A. Barash, New York, N.Y., assignor to Bendix Aviation Corporation, Teterboro, N.J., a corporation of Delaware Filed June 24, 1955, Ser. No. 517,813

3 Claims. (Cl. 330—20)

This invention pertains to control systems and more particularly to an automatic control system usable in aircraft and which employs a transistor amplifier having a variable feedback.

This application is a continuation-in-part of my co-pending patent application for Control System, Serial No. 487,239 (now abandoned), which describes and claims a servo amplifier having a pre-amplifier portion including three transistor stages, a demodulater stage, and a magnetic amplifier stage. My co-pending patent application and the present invention are assigned to the same assignee.

The amplifier portion of my aforementioned co-pending patent application includes a fixed feedback loop and is particularly useful in control systems for aircraft. While the amplifier of said co-pending patent application worked well, I have found that when the aircraft traversed a wide range of altitudes, the gain of the amplifier tended to vary due to the great and rapid temperature changes experienced.

An object of the present invention, therefore, is to provide a novel amplifier stabilized for temperature changes.

Another object is to provide a novel transistor amplifier having a feedback loop which causes the amount of feedback to vary with temperature due to a thermistor in a feedback network.

A further object is to provide a novel transistor amplifier including a variable feedback loop which causes the amount of feedback to vary with ambient temperature.

A further object is to provide a servo amplifier employing transistor stages of amplification and wherein the transistor parameters which change with temperature provide an amplifier circuit whose overall gain will remain substantially constant due to a novel variable feedback loop.

A further object is to provide a novel feedback network for a transistor amplifier that maintains a substantially constant gain over a wide temperature range.

The present invention contemplates a servo amplifier which includes a transistor type pre-amplifier feeding a demodulator employing saturable reactor elements for converting carrier frequency voltages into proportional differential direct current voltages and providing a particular gain. The transistor pre-amplifier employs a variable feed-back loop, one configuration of which may be a thermistor and a conventional resistor connected in series with each other and with said thermistor-resistor series circuit being in parallel with a conventional resistor. The variable feedback loop provides substantially constant gain for the pre-amplifier throughout wide temperature ranges, including a range of 25° C. to −55° C.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and not to be construed as defining the limits of the invention.

The single figure in the drawing shows a servo amplifier including a pre-amplifier portion having three transistors, a demodulator, and a magnetic amplifier.

Referring to the drawing, conductors 177, 101, and 204 are connected to different sources of signal input as set forth in my aforementioned co-pending patent application.

The three inputs of the conductors are combined, as set forth hereinbefore, and fed as a single input to the first transistor of the three-stage transistor pre-amplifier. Resistor 300 is serially connected in conductor 177, and resistor 301 is serially connected in conductor 204, and these two circuits are combined with conductor 101 at a common terminal 302 in the adaptor. Resistors 300 and 301 are adding resistors to raise the input impedance to the desired level. Resistor 303 is a gain adjusting resistor for controlling the sensitivity of the entire amplifier. Resistors 304, 305, and 306 provide direct current bias stabilization for the transistor 310. A capacitor 307 is a coupling capacitor. The signal is developed across resistor 308 with said resistor being connected from ground to the emitter 309 of the transistor 310, which transistor also has a base 311 which is connected to one side of the coupling capacitor 307 and the biasing network associated with transistor 310. Resistors **311*a*, 312, 313, 314, and 315 are employed in a network for stabilizing and biasing the transistor 316, while capacitors 317 and 318 are used for decoupling. Transistor 310 also has a third element, namely, a collector 319 which is connected to B plus (B+) and the biasing network of transistor 310. A decoupling capacitor 320 is connected from the emitter 309 of the first transistor 310, and the base 321 of the second transistor 316. The emitter 322 of the second transistor is connected to the biasing network of the second transistor via resistor 315. The collector 323 of the second transistor is connected to one side of the primary of the coupling transformer 324, while the opposite side of the primary of the coupling transformer 324 is connected to B plus (B+) by way of the dropping resistor 325. Resistor 325 and capacitor 326 provide a decoupling network for filtering purposes, the opposite sides of capacitor 326 being connected to ground. Resistors 327, 328, 329 and 330 are for biasing and stabilizing and are connected in a network with the third transistor 331. The transistor 331 has a base 332 connected to one side of the secondary of decoupling transformer 324, an emitter 333 connected to one side of resistor 330, and a collector 334 connected to one side of the primary of the coupling transformer 335. Capacitor 336 is used for decoupling, while capacitor 337 is in parallel with resistor 328 and is connected from ground to one side of the secondary of coupling transformer 324. Capacitor 340 is connected from the collector 323 of the second transistor to ground, while capacitor 341 is connected from the collector 334 of the third transistor to ground. The output of the third transistor is connected to one side of the primary of transformer 335** with the opposite side of said primary being connected to B plus (B+).

Transistors 310, 316 and 331 are junction transistors of the N–P–N type. Stage 1 is connected in a common collector configuration. This affords a high input impedance and a very low output impedance. The high input impedance is used to prevent attenuation of the input signal to any appreciable extent. This configuration is analogous to a cathode follower vacuum tube circuit and in the present showing has a voltage gain slightly less than unity. The first stage is coupled to the second stage by means of an R–C type coupling in lieu of a transformer-type coupling because of the low output impedance afforded by the common collector stage and the low input impedance of the common emitter configuration. The second stage of the pre-amplifier, which includes transistor 316, is a gain stage and has a grounded emitter, since this affords the highest voltage gain of the three transistor configurations shown in the drawings. The unbypassed resistor 315 in the emitter circuit serves a two-fold purpose. Because of its stabilizing effect upon collector current and stage gain, it makes interchangeability of transistors much more feasible; secondly, it tends to raise the input impedance of the associated base. This reduces loading effects and consequent gain loss due to interaction between the first and second stages. Since transistor 331 is connected in the common-emitter configuration to obtain high gain, its input impedance is low, while the output impedance of the second stage is very high. The third stage is similar to the second stage except that it develops a higher output voltage in order to drive the magnetic demodulator.

Overall negative feedback is provided from the collector 334 of the output stage back to the unbypassed portion of the emitter of the transistor 316 by way of a feedback loop consisting of a resistor 345 which is in parallel with a series circuit consisting of a thermistor 400 and a resistor 401, with said thermistor 400 and said resistor 401 being connected in parallel with the resistor 345. A capacitor 346 is serially connected with said feedback loop to prevent direct current from feeding back to the emitter 322. The negative feedback loop or circuit holds the gain substantially constant or effectively constant to offset a change in gain due to temperature variations over an appreciably wide temperature range.

The output of the three stages of the transistor preamplifier is fed into a demodulator via coupling transformer 335 which has its secondary connected to a pair of saturable reactor elements 347 and 348, each consisting of a core and having a gate winding and a reset winding thereon, with said reset windings being serially connected and having a mid-tap terminal 349, while said gate windings are serially connected and have a mid-tap 350. The secondary of the transformer 335 has electrical mid-tap 351. Diodes or rectifying elements 352 and 353 are each serially connected, respectively, between the secondary of the coupling transformer 335, and the outer terminals of the serially connected gate windings 347 and 348. The transfer device in the present application is a magnetic demodulator having control windings 354 and 355 with a mid-tap 356 which is in common with a mid-tap terminal 357 for connection to a gating voltage.

Each of the control windings has a capacitor and resistor connected thereacross. A second pair of diodes 357 and 358 are connected, respectively, to the outer legs of the gate windings and the outer legs of the control windings. The four legs of a bridge circuit of the magnetic amplifier has terminals 360 and 361 which are connected, respectively, to ground and to conductor 130 with the output of the amplifier. Terminals 362 and 363 are connected to conductors for supplying a source of excitation to the bridge portion of the magnetic amplifier. A reference voltage $E_R$ and a gating voltage $E_G$ is supplied to the demodulator from a common source of excitation having a frequency similar to that of the periodicity of the input signal which is fed from the output of the preamplifier. The reference voltage $E_R$ is connected across terminals 351 and 349, respectively, of the mid-point of the secondary of the coupling transformer 335, and the mid-point of the gating windings of the saturable reactor elements 347 and 348; while the gating voltage $E_G$ is connected between the mid-point of the gate windings of the saturable reactor elements and the terminal 357 which is the mid-point of the control windings. When a signal is impressed upon the demodulator, the voltages appearing across diodes 352 and 353 will be different from each other, thereby causing different amounts of reset of cores in the saturable reactors. Different differential amounts of reset causes corresponding unequal conduction through rectifiers or diodes 357 and 358, which is proportional to the magnitude of a signal. The polarity of this differential current output voltage is determined by the relative phase of the signal with respect to the reference voltage $E_R$.

When there is no signal, the outputs are equal or balanced. When a signal is impressed on the demodulator, at one instant the signal opposes the reset voltage $E_R$, through one rectifier, such as 352, and the output of that half of the demodulator increases across the respective load winding. At the same instant, the input signal impressed across the other half of the transformer 335 secondary adds to the reset voltage $E_R$, and the output of that half of the demodulator decreases across the other load winding. It will be seen that under this condition there is a differential output voltage across the outside terminals of said control windings, so that either one or the other of the legs of the bridge portion of the magnetic amplifier will be unbalanced, which unbalance will be reflected in the output provided across terminals 360 and 361, which feed conductor 130.

When there is no signal, reference voltage $E_R$ provides power for the reset windings, and the gating voltage $E_G$ provides power for the gating windings. Under a no signal condition the differential power output is zero.

Therefore, it will be seen that at a "no signal" condition, both sides of the demodulator will balance, while at a "signal" condition, one side of the demodulator drives more than the other side depending on the phase and amplitude of the input signal so that the magnetic amplifier bridge arrangement is unbalanced and the variable phase winding 134 of the servo motor will be driven accordingly in either one direction or the other.

The present application shows a magnetic amplifier for driving a servo motor which may be used for actuating the control surface or rudder of an aircraft as set forth in my aforementioned co-pending patent application.

Normally, transistor parameters change with changes in temperature. Therefore, with large changes in temperature, such as over the range of from 25° C. to −55° C., there would ordinarily be a great change in gain of the transistor amplifier. In my aforementioned co-pending patent application the feedback loop is of the fixed feedback loop type. The present application has a variable feedback loop which causes the amount of feedback to vary with changes in temperature due to a thermistor in the feedback network. The thermistor is a temperature sensitive resistor. Ordinarily, as ambient temperature increases, the resistance of the thermistor decreases.

The value of the components in the variable feedback loop provide substantially constant gain over a wide range and will vary with different amplifier circuitry and different components. In arriving at a particular circuitry for the variable feedback loop, a decade resistor box was used to obtain information to draw a curve showing the value of feedback resistance necessary to maintain constant gain over the wide temperature range which the equipment would ordinarily be subjected to when used in high performance aircraft flying at different altitudes and in different geometrical latitudes.

The feedback network must have a substantially constant resistance at and above room temperature, but must increase in resistance as the ambient temperature decreases, said increase in resistance reducing the amount of negative feedback to maintain a gain substantially constant. When the temperature gets colder, it is desirable to get less feedback to keep gain constant. Therefore, the equivalent resistance of the feedback loop will increase depending on the temperature characteristics of the entire amplifier.

The feedback circuit as shown in the drawing is suitable for the transistor amplifier of the present application and fundamentally employs a conventional resistor in parallel with a series circuit including a conventional resistor and a thermistor or temperature sensitive resistor.

One feedback circuit which was found to be quite suitable for the particular transistor-amplifier circuit shown in the drawings has the values as follows:

Resistor 345 has 620,000 ohms
Resistor 401 has 560,000 ohms
Thermistor 400 has 10,000 ohms at 25° C.

One thermistor that is suitably used in the feedback circuit as shown is type VECO 41R1, manufactured by Victory Engineering Corporation, New Jersey.

Any thermistor or other temperature sensitive element having a suitable negative temperature coefficient which is used in the variable feedback loop must be exposed at all times while operating, since the ambient temperature at the base of the thermistor is representative of the mean temperature of the transistors of the servo amplifier. The thermistor must not be sealed off or shielded from the mean ambient temperature of the transistors. The location of the thermistor is important, and it must be disposed so as to have an ambient temperature that is representative of the mean temperature of all transistors in the servo amplifier.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An amplifier for a control system subject to variations in ambient temperature conditions comprising a pair of transistors providing successive stages for amplifying a voltage, a feedback loop from the output of one transistor to said other transistor, and means operatively connected in said feedback loop for varying the feedback voltage level as a function of ambient temperature to temperature stabilize the amplifier output, said means including a parallel circuit having a temperature sensitive resistor in one leg thereof which increases the amount of feedback in accordance with increases in ambient temperature.

2. An amplifier for a control system subject to variations in ambient temperature conditions comprising a transistor amplifier having at least a pair of transistors providing gain stages for amplifying a voltage, a feedback loop from the output of one transistor of the transistor amplifier to said other of said pair of transistors, and means including a thermistor operatively connected in said feedback loop for varying the feedback voltage level as a function of ambient temperature to temperature stabilize the amplifier output.

3. An amplifier as set forth in claim 2 wherein said thermistor is physically located relative to the transistors of said amplifier so as to have an ambient temperature that is substantially representative of the mean temperature of all transistors in said amplifier.

References Cited in the file of this patent

UNITED STATES PATENTS

| | | |
|---|---|---|
| 2,647,957 | Mallinckrodt | Aug. 4, 1953 |
| 2,764,643 | Sulzer | Sept. 25, 1956 |
| 2,774,826 | Moulon | Dec. 18, 1956 |
| 2,776,372 | Ensink et al. | Jan. 1, 1957 |
| 2,801,296 | Blecher | July 30, 1957 |
| 2,801,297 | Becking et al. | July 30, 1957 |
| 2,808,471 | Poucel et al. | Oct. 1, 1957 |
| 2,810,024 | Stanley | Oct. 15, 1957 |
| 2,828,050 | Pinckaers | Mar. 25, 1958 |

OTHER REFERENCES

"Electronics," April 1954, Robert L. Riddle (page 169 relied on).

"Feedback Control Systems" (Burns and Saunders), published by McGraw-Hill, 1955 (page 214 relied on).

Coole and Markus: "Electronics Dictionary," McGraw-Hill Book Co. Inc., 1945, page 388.

Shea text, "Principle of Transistor Circuits," September 1953, page 351.